(12) United States Patent
Tsadik et al.

(10) Patent No.: US 9,128,924 B2
(45) Date of Patent: Sep. 8, 2015

(54) METHOD AND APPARATUS FOR WIRELESS BROADBAND SYSTEMS DIRECT DATA TRANSFER

(75) Inventors: Meir Tsadik, Hod Hasharon, IL (US); Moshe Tanach, Bet Herut (IL); Assaf Touboul, Natanya (IL)

(73) Assignee: QUALCOMM Incorporated, San Diego, CA (US)

( * ) Notice: Subject to any disclaimer, the term of this patent is extended or adjusted under 35 U.S.C. 154(b) by 981 days.

(21) Appl. No.: 13/151,325

(22) Filed: Jun. 2, 2011

(65) Prior Publication Data

US 2012/0011295 A1    Jan. 12, 2012

Related U.S. Application Data

(60) Provisional application No. 61/350,932, filed on Jun. 3, 2010.

(51) Int. Cl.
*G06F 13/28* (2006.01)

(52) U.S. Cl.
CPC ..................... *G06F 13/28* (2013.01)

(58) Field of Classification Search
USPC ................. 710/22, 23, 26, 27, 305, 308, 310
See application file for complete search history.

(56) References Cited

U.S. PATENT DOCUMENTS

| | | | | |
|---|---|---|---|---|
| 5,758,182 A | * | 5/1998 | Rosenthal et al. | 710/3 |
| 6,341,328 B1 | * | 1/2002 | Heer | 711/112 |
| 6,401,143 B1 | * | 6/2002 | Lupien et al. | 710/22 |
| 6,754,509 B1 | * | 6/2004 | Yu et al. | 455/556.1 |
| 7,058,735 B2 | * | 6/2006 | Spencer | 710/24 |
| 2003/0217218 A1 | * | 11/2003 | Gaidukov | 710/307 |
| 2006/0179180 A1 | * | 8/2006 | Sugita et al. | 710/22 |
| 2009/0100200 A1 | | 4/2009 | Bouvier | |

FOREIGN PATENT DOCUMENTS

| | | |
|---|---|---|
| EP | 1193605 A2 | 4/2002 |
| EP | 1708091 A1 | 10/2006 |
| EP | 2393013 A2 | 12/2011 |
| JP | 1014655 A | 1/1989 |

OTHER PUBLICATIONS

User-Level DMA Without Operating System Kernel Modification, Markatos et al., IEEE 1997.*
European Patent Office, European Search Report dated Aug. 3, 2012, EP Patent Application No. 11168676.2 to DesignArt Networks Ltd., 6 pgs.

* cited by examiner

*Primary Examiner* — Khanh Dang

(57) ABSTRACT

Apparatus and method for direct data transfer in a wireless broadband system having an operating system, the apparatus including a central processing unit (CPU), at least one dedicated Direct Memory Access unit (DMA) local to the CPU, coupled directly to the CPU, and a commands FIFO (First In First Out) receiving commands from the CPU and automatically transferring the commands in sequence to the DMA for implementation by the DMA, in the absence of intervention by the operating system.

14 Claims, 4 Drawing Sheets

46 44→ 48  26/05/2011

| | Symbol 1 | Symbol 2 | Symbol 3 | Symbol 4 | Symbol 5 | Symbol 6 | Symbol 7 |
|---|---|---|---|---|---|---|---|
| SC0 | 0 | 1200 | 2400 | 3600 | 4800 | 6000 | 7200 |
| SC1 | 1 | 1201 | 2401 | 3601 | 4801 | 6001 | 7201 |
| SC2 | X | X | 2402 | 3602 | X | 6002 | 7202 |
| SC3 | 3 | 1203 | 2403 | 3603 | 4803 | 6003 | 7203 |
| SC4 | 4 | 1204 | 2404 | 3604 | 4804 | 6004 | 7204 |
| SC5 | X | X | 2405 | 3605 | X | 6005 | 7205 |
| SC6 | 6 | 1206 | 2406 | 3606 | 4806 | 6006 | 7206 |
| SC7 | 7 | 1207 | 2407 | 3607 | 4807 | 6007 | 7207 |
| SC8 | X | X | 2408 | 3608 | X | 6008 | 7208 |
| SC9 | 9 | 1209 | 2409 | 3609 | 4809 | 6009 | 7209 |
| SC10 | 10 | 1210 | 2410 | 3610 | 4810 | 6010 | 7210 |
| SC11 | X | X | 2411 | 3611 | X | 6011 | 7211 |

METHOD AND APPARATUS FOR WIRELESS BROADBAND SYSTEMS DIRECT DATA TRANSFER

CROSS REFERENCES

The present Application for Patent claims priority to U.S. Provisional Patent Application No. 61/350,932 by Tsadik et al., entitled "Method and Apparatus for Wireless Broadband Systems Direct Data Transfer," filed Jun. 3, 2010, assigned to the assignee hereof, and expressly incorporated by reference herein.

FIELD OF THE INVENTION

The present invention relates to software based communication systems in general and, in particular to software implementation of PHY (physical layer) and MAC (Medium Access Controller) levels in wireless broadband communication systems, particularly 4G (fourth generation) and higher.

BACKGROUND OF THE INVENTION

Software based communication systems deal with the transfer of massive quantities of data. A software implementation of the physical layer of wireless broadband communication systems, particularly 4G wireless systems, deals with very high rate data transfers due to the wider transmission spectrum and shorter frames of transmission. These systems deal with the transfer of large amounts of data that must be completed within tight timing constraints. Direct Memory Access (DMA) hardware units are used to fulfill data transfer tasks. FIG. 1 presents a typical conventional DMA implementation. DMA 10 includes a master interface 11 and a slave bus interface 12 (registers) and is coupled by an advanced high performance system bus 13 to a plurality of peripherals, such as USB's, printers, etc., of which only two are shown, a source peripheral A 14 and a destination peripheral B 15. Each source peripheral 14 is associated with a source FSM (Fast Sequencing Module) 9 and each destination peripheral 15 is associated with a destination FSM 19. A driver CPU 16 is coupled to bus 13 for programming the registers (master interface (I/F) for transferring data 11 and control interface (I/F) 12 for transferring control), i.e., from where to read, where to write and how much data to take each time, or the size of the data block. Driver CPU 16 is coupled to a plurality of CPU's in the system (not shown), which share the use of the same DMA 10. A plurality of peripheral buses are provided for delivering control information to DMA 10. Multiple DMA transactions may take place simultaneously through different channels. Channels are available for performing transactions in parallel, but they all use the same bus. An arbiter 18 is provided to select the order of memory transfer between various destination peripherals.

The characteristics of existing DMAs are:
  Transfers—A DMA can transfer a block of data of known length from: 1) One memory location to another memory location. Usually it transfers data from slow memory, like DRAM, to a faster memory inside the CPU (Central Processing Unit); 2) A memory to an output device; 3) An input device to memory.
  Shared resource—A DMA is a shared hardware device, handled by the Operating System driver. All CPUs in the system and all tasks use a single driver entity.
  Programming—Programming of the DMA requires loading of a number of control words, like Source address, Destination address, stride, block length, bus control information, etc. The DMA programming is accomplished by writing control information via a control bus. Usually the control bus is slower than the CPU.
  Addresses sequence—Addresses in memory are either contiguous or with pre-defined jumps, called stride. Copying from a contiguous memory block into a non-contiguous memory block with fixed stride is called "scatter", while transactions that copy from a non-contiguous block with fixed stride into a contiguous memory block are called "gather".
  A DMA can either be programmed to perform a single block transfer or it may read the programming data for the next transaction automatically from a linked list in the memory.
  Synchronization—Many DMA transactions in 4G implementations take place between a local memory of a hardware unit and a main system memory. The traditional approach is, once the hardware unit completes generating data into its local memory, it issues an interrupt signal to a processor (its driver in the operating system) indicating that the data is available. The processor stops its current operation and programs the DMA to transfer the data from the hardware unit local memory into the system memory. Once the DMA has finished the memory transfer, it also generates an interrupt signal to the CPU of the operating system. The CPU then programs the hardware unit to start processing the next task. This process requires two interrupts to the CPU (operating system) for each DMA transaction. The overhead is significant.

The main limitations of conventional DMA units in high speed communication systems are:
  DMA programming is implemented by the operating system—As the DMA is a shared resource for all tasks and all CPUs in the system, programming each DMA transaction requires an Operating System (OS) request. This mechanism requires control transfer from the running process (or task) to the OS, which imposes a big overhead. In 4 G communication systems, a single unit may require 100,000-1,000,000 different transactions in one second. Programming so many transactions in one second through the operating system is not feasible.
  DMA control is implemented through a control bus. Control buses are slow and require many CPU clocks to program one parameter. FIG. 1 shows that the CPU to DMA interface is implemented by system and control buses. Programming a typical DMA transaction requires writing about 5 words, which causes the programming of a typical DMA transaction to take 15-20 CPU cycles. This is a major obstacle when DMA transactions are short (e.g., up to 100 words).
  The DMA transaction addresses sequence is limited to linear or scatter/gather, only. In 4G systems, many data blocks are received with different timing and, thus, are stored in different locations in memory. When arbitrary patterns of data access are required, conventional DMA cannot be used, but the CPU calculates each address separately and uses load store instruction. The efficiency of data fetching determines the efficiency of the processing. Thus, non-efficient DMA transfers translate into non-efficient CPU usage.
  Synchronization—As described in the previous section, the synchronization of DMA operation with the application software requires two operating system interrupts. With the high number of DMA transactions, a mechanism that requires 2 interrupts to the CPU for each DMA transaction is not feasible.

It is an object of the present invention to solve many of the limitations of existing DMA units in high end wireless communication products.

SUMMARY OF THE INVENTION

The present invention solves the problems of standard DMA, particularly when applied to 4G telecommunication systems. This is accomplished through dedicating one or two DMAs to each processor, with a direct connection between each processor and its DMA for both control and data transfer. The DMA contains a mechanism for address generation to enable transfer of complex data structures in memory. Activating DMA transactions and receiving completion indications are carried out using hardware signals, without requiring intervention of the operating system.

According to the present invention, there is provided an apparatus for direct data transfer in a wireless broadband system having an operating system, the apparatus including a central processing unit (CPU), at least one dedicated Direct Memory Access unit (DMA) local to the CPU, coupled directly to the CPU, and a commands FIFO (First In First Out) receiving commands from the CPU and automatically transferring the commands in sequence to the DMA for implementation by the DMA, in the absence of intervention by the operating system.

According to a preferred embodiment, the apparatus further includes a local data memory coupled to the DMA.

Further according to a preferred embodiment, the apparatus further includes an offset table including a plurality of offsets, and an address generation unit in the DMA for calculating addresses from a base and at least one offset from the offset table for accessing the local data memory.

According to further embodiments, the apparatus further includes means for receiving an enable signal from a hardware unit for initiating a transaction between the hardware unit and the DMA.

There is further provided, according to the invention, a method for direct data transfer in a wireless broadband system, the method including coupling at least one Direct Memory Access unit (DMA) to a central processing unit (CPU), local to the CPU, programming the DMA by the CPU via a commands FIFO (First In First Out), automatically fetching the commands in sequence and configuring itself according to each the command by the DMA to initiate a DMA transaction.

According to a preferred embodiment, the step of configuring itself includes providing a base address to the DMA and calculating, in the DMA, a plurality of addresses in a data memory from the base and a plurality of offsets in an offset table.

BRIEF DESCRIPTION OF THE DRAWINGS

The present invention will be further understood and appreciated from the following detailed description taken in conjunction with the drawings in which:

FIG. 3 is an illustration of a typical 4G wireless tile structure; and

DETAILED DESCRIPTION OF THE INVENTION

The present invention relates to an improved system and method for data transfer in broadband wireless communication systems, particularly 4G and higher. This is accomplished by providing a dedicated DMA to each processor, with a direct connection between the processor and its DMA for control and data transfer. These dedicated DMAs contain a mechanism for address generation (explained below) to enable transfer of complex data structures in memory, and the option for initiating transaction and receiving notifications using hardware signals, without requiring support of the operating system.

Key features of the apparatus and method of the present invention are:

The DMA is local to a CPU. There is no need to handle it by the OS as a shared resource.

The DMA can access an arbitrary list of addresses controlled by a Look Up Table (LUT) or offset table.

Each CPU controls its associated DMA through control commands which are sent through a commands FIFO directly connected thereto.

Synchronization of the DMA with the application software is performed using a dedicated control signal of the attached FIFO. This mechanism replaces the traditional synchronization mechanism performed by the CPU using interrupts.

Figure 1:
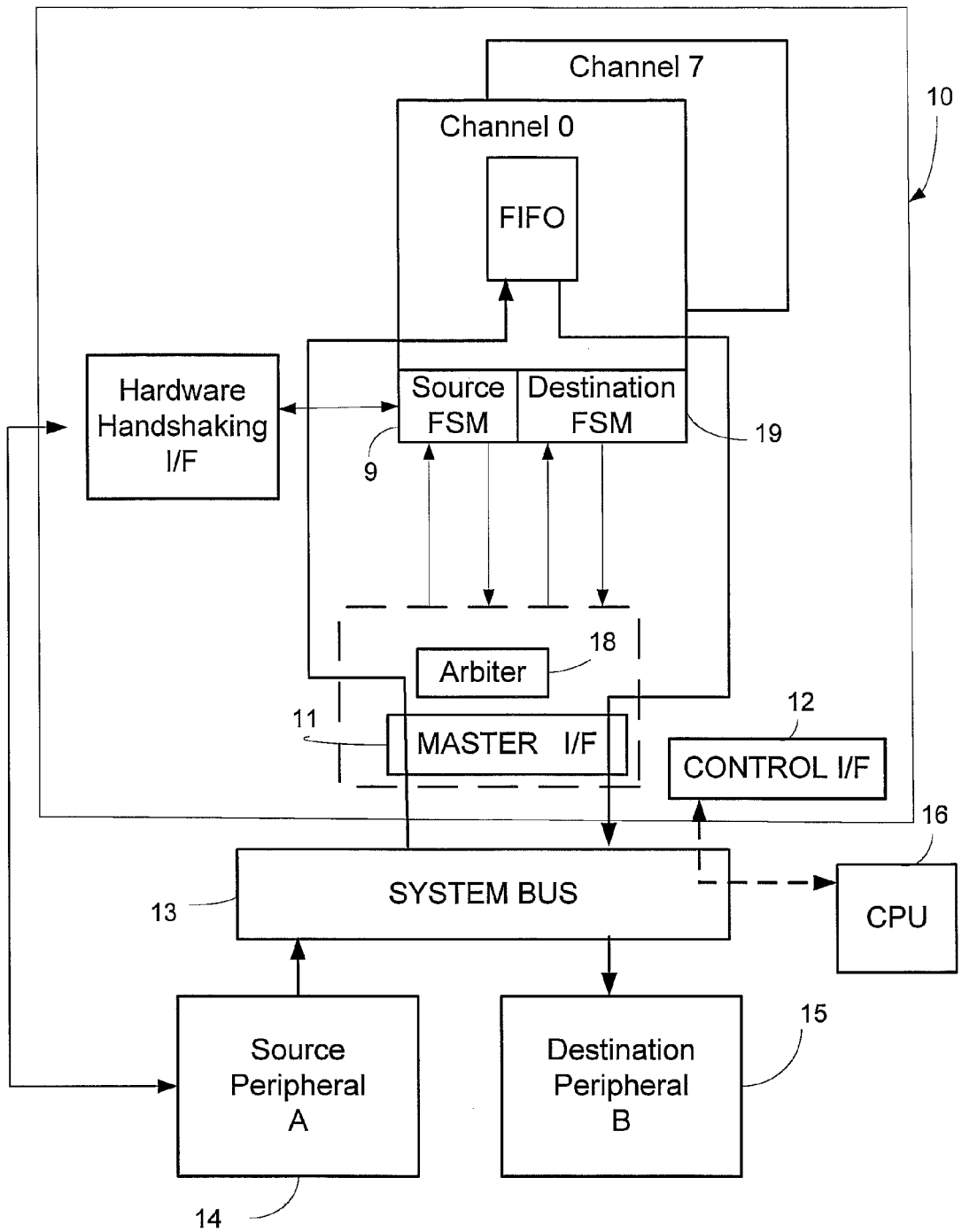
FIG. 1 is a schematic illustration of a prior art DMA arrangement.
Figure 2:
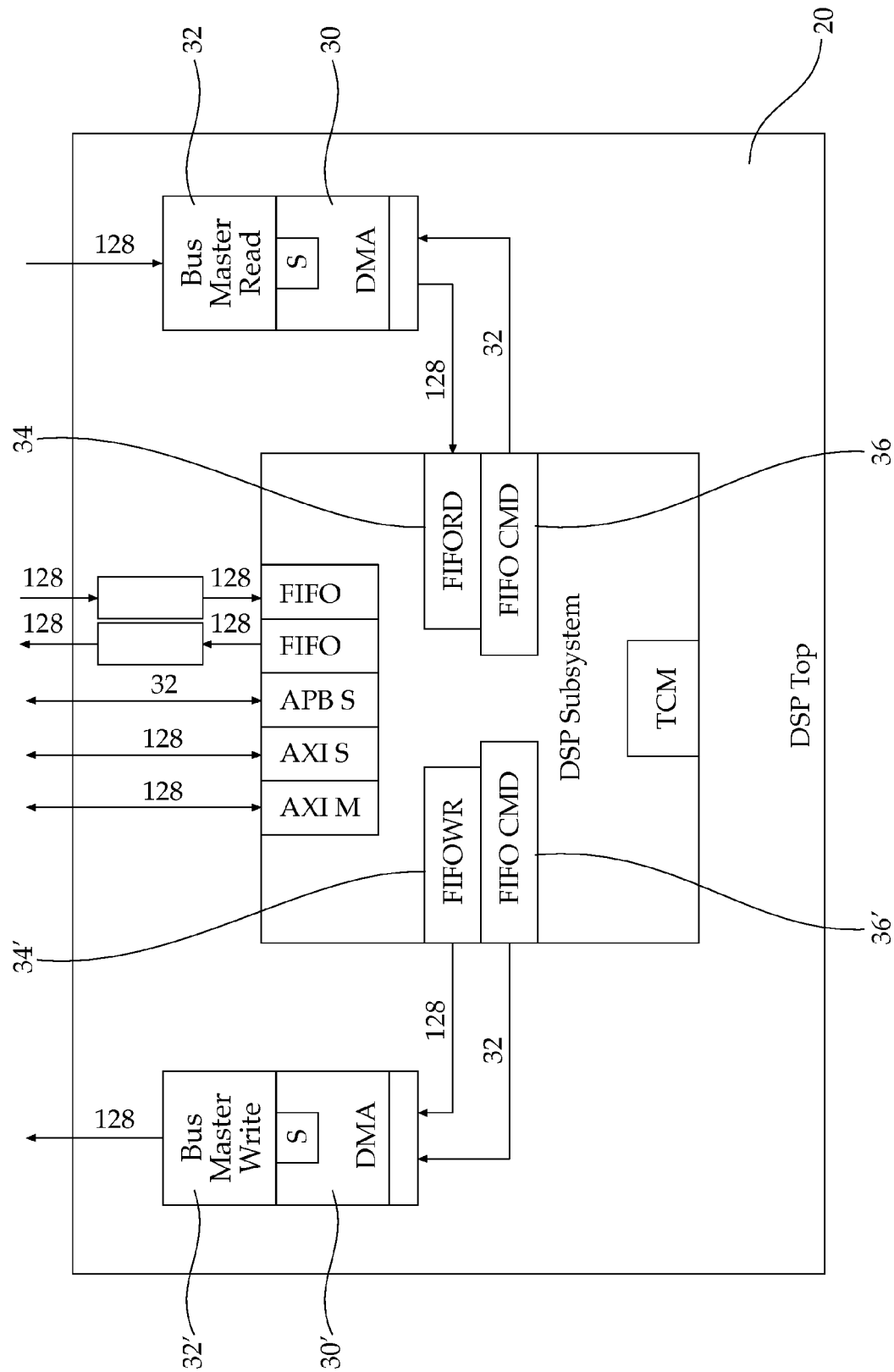
FIG. 2 is a schematic illustration of a digital signal processor (DSP) with a pair of DMAs according to one embodiment of the invention.

Referring now to FIG. 2, there is shown a schematic illustration in block diagram form of a digital signal processor (DSP) or Central Processing Unit (CPU) 20 with a pair of DMAs 30, 30', constructed and operative in accordance with one embodiment of the present invention. While a single DMA 30 according to the invention can be utilized for both reading and writing, in the illustrated preferred embodiment, two DMAs are provided. DMA 30 is coupled to a bus master 32 for reading data from any remote peripheral, CPU or memory attached to this bus, while DMA 30' is coupled to a bus master 32' for writing data to any remote peripheral, CPU or memory hooked to the bus. Alternatively, a single bus master that can read or write can be utilized, instead of two separate bus masters. A read FIFO 34 is attached to DMA 30 for holding the received data until the DSP fetches it, and a write FIFO 34' is attached to DMA 30', which holds data sent by the DSP until written to the remote unit.

A dedicated command FIFO 36, described in detail below, is coupled to DMA 30 for providing operating commands from DSP 20, and a similar dedicated command FIFO 36' is coupled between DMA 30' and DSP 20.

The following features provide the DMA of the present invention with improved properties relative to conventional DMAs:

Locality—The dedicated DMA 30 is attached to a processor or a hardware unit 20, as shown in FIG. 2. The attached side of the DMA unit is called a "local unit" 34, 34'. The local unit 34, 34' may have a single address (when implemented as a FIFO coupled to a CPU) or a range of addresses (when utilizing a local memory buffer coupled to a hardware unit). The unit on the other side of the transaction (not shown) is called the "remote unit". The remote unit, which resides on a shared bus, is accessed via the bus masters 32, 32'. The remote unit may also have a single or multiple addresses. The dedicated DMA transfers data between the local unit and the remote unit. Transfers are accomplished by copying blocks of data. The DMA always serves its attached local unit, only, while the local processor controls the DMA directly.

The DMA units 30, 30' are dedicated to the processor 20 or hardware unit, as shown in FIG. 2. As such, they are treated as a local resource and can be handled by the running application software of processor 20. There is no need for operating system support to handle DMA transactions.

Addressing—The novel DMA is designed to transfer either a contiguous block of data or an arbitrary non-contiguous data structure. Transfer of contiguous blocks is performed by specifying a start address and transfer count. Stride is also possible. Transfer of a repeating arbitrary data structure is accomplished by specifying a base address of the data structure and an offset of each element of the data structure, as explained below.

FIG. 3 shows a typical example of a tile structure of addresses in a memory 40. In this example, the data is received as a sequence of 1200 elements (sub-carriers (SC) 42) for every symbol 44, as shown. A different symbol is received every 70 nSec. FIG. 3 shows a single block of 12 sub-carriers over 7 symbols. 100 such blocks create 7 full symbols. Each block includes a plurality of tiles, each holding data. The data is fetched by means of the tiles, tile by tile. In the illustrated embodiment, the different tiles are shown by their outlines. The first tile 46 will have a base 0 and will include offsets 0, 1, 3, 1200, 1201, 1203, 2400, 2401 2402 and 2403. This data structure repeats itself in the memory. Thus, data stored in memory according to a repeating complex pattern can be retrieved using an offset table. The offset table for reading the entire block is created by listing the offsets of all the elements in this block. The total size of fetched data is 72 elements out of 84 existing in this example. The system of the present invention can read 200,000 such blocks every second. The DMA includes a dedicated memory (Look Up Table) that contains the offset table (described below with reference to FIG. 4). This table should be created once and will be referenced 200,000 times every second. In this example, the DMA is programmed to transfer a block containing 72 elements. The base of the block required to be fetched at any given time is provided to the DMA as part of the control command. Then, the DMA creates the 72 different addresses of the additional elements of the tile by adding each offset to the given base address. It will be appreciated that, in this way, the memory can store the data in a fixed pattern starting in different locations, and the processor need only tell it which pattern, where to start and how many words to take. This means that, instead of the CPU calculating the address each time, the addresses are calculated by the DMA using the offsets table.

Each block transfer is called a transaction. Transactions of the same type share the same offset table. The offset table may contain a few transaction types 46,48 as seen, for example, in FIG. 3. The offset table of each different transaction type resides in a different place in offset memory. The DMA is controlled to use the offset table from a specific starting point, according to the particular transaction.

Figure 4:
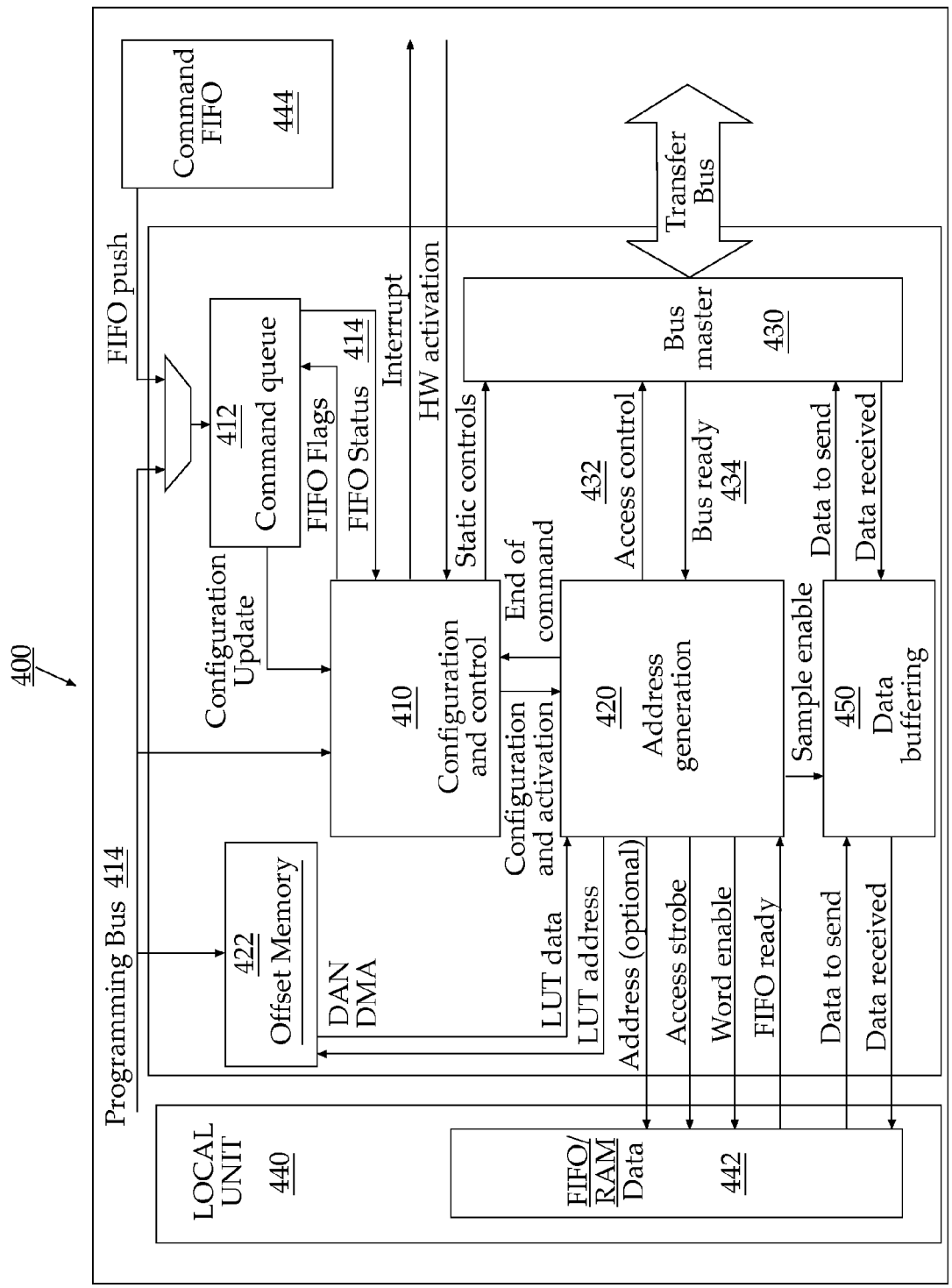
FIG. 4 is a schematic illustration of a DMA, constructed and operative in accordance with one embodiment of the present invention.

Controlling the DMA—Controlling and programming of the DMA is done in two phases: 1) Initialization, which is performed once and used many times; 2) Initiating a transaction, which is done frequently and with low overhead. The most important function of the initialization is setting the offset table. It will be appreciated that the offset tables may be changed but usually are set only once. Initialization also sets the debug options of the DMA and configuration parameters, like bus width. Initialization is performed by the Operating System (OS) through the programming bus, as shown in FIG. 4. The same programming is used for many transactions (200,000 per second in the previous example).

DMA transaction initiation is carried out by the running application software through writing into the dedicated control FIFO associated with that DMA, which is called a "commands queue". The commands queue includes: 1) Local address; 2) Remote start address (Base); 3) transaction length; and 4) bus control. The Commands Queue FIFO is directly connected to the "Local" processor to eliminate any slow bus overhead. Initiating a new transaction usually takes a single CPU operation, which is done in a single cycle. As long as the commands queue is not empty, commands are fetched and the DMA configures itself according to the new command. Each command initiates another DMA transaction.

Enabling signal—The DMA can be programmed to wait for an enable signal. This option is used when the remote unit is a hardware unit. The enable signal is issued by the hardware unit, once the hardware unit has completed generating the data. Once the memory transfer (series of transactions) is completed, the DMA may generate a signal to the hardware unit to start processing the next task. This mechanism enables a sequence of transactions between the hardware unit and the memory without processor intervention, as compared to the traditional mechanism which requires two interrupts for each transaction. Synchronization of the DMA and the HW element is performed by enable signals going from the hardware units to the DMA and vice versa.

Referring now to FIG. 4, there is shown a DMA 400, constructed and operative in accordance with one embodiment of the present invention, in block diagram form. DMA 400 in the illustrated embodiment includes the following blocks: a configuration and control block 410 coupled to an address generation block 420 and to a command queue (preferably FIFO) 412. Configuration and control 410 is programmed by the processor associated with the DMA either directly through a command FIFO or via a programming bus 414. Address generation 420 is coupled to an offset memory 422. Programming bus 414 also used for setting the offset memory 422 by writing the offset list. Address generation unit 420 is also coupled to a data buffering block 450 and to a local unit data memory, FIFO or RAM 442 holding either the data received or the data to be sent, depending on the direction of the DMA. Data buffering block 450 is also coupled to bus master 430 for receiving data to be stored temporarily before sending to or reading from local FIFO/RAM 442. A local unit command FIFO 444 is also provided coupled to command queue 412 for pushing commands to the command queue.

Configuration and control 410 holds all configuration registers and the mechanism to work with the FIFO command queue 412. When the DMA is active (i.e., controlled by a register in the block), the command queue (FIFO) status signal 414 is monitored. The status of the command queue can indicate whether there are or are not instructions waiting to be carried out, or that the FIFO is full and cannot accept any more. When a command is available, it is fetched and executed by passing the relevant controls to address generation block 420. When the command is completed, a new command will be fetched from command queue 412, when available, unless a command ends with automatic stall. In this way, a plurality of commands can be implemented in sequence by the DMA without additional programming or outside intervention. When a command ends with automatic stall, i.e., do not go to the next command until released. Release from the stall can be accomplished by a command through the control bus or by a hardware handshake mechanism (an enabling signal).

For DMA read configuration, when local unit FIFO 442 is full, the DMA stalls automatically, without a command from the CPU.

Address generation 420 is configured and activated by configuration and control block 410 and receives address generation instructions therefrom. This block drives the control of the system bus 430 (i.e., tells bus 430 where to send or retrieve data) via access control 432. Thus, address generation 420 gets the base address and the instructions from the command. It takes the base and each offset, one after the other, and sends the addresses, one after another, to the transfer bus, which transfers the appropriate data to or from the FIFO or RAM. When a command is active, single or burst transfers are sent to the bus, as long as the bus allows it, as indicated by bus ready signals 434 or until all the transaction size was transferred. A new command can be loaded to address generation block 420 from the configuration and control unit 410 immediately after the last transaction is closed, and the next destination or source address is provided to the bus.

Offset memory 422 holds the offset sequences. According to some embodiments of the invention, the offset memory is a single port SRAM with peripheral interface for writes and for reads from the processor side. Also, it performs synchronous memory interface for reads from the DMA engine. To allow offsets update during DMA operation, preferably two memory instances are used, so the peripheral bus can update one instance while the DMA controller uses the other.

It will be appreciated that the arrangement of the present invention has many advantages over the conventional DMA arrangement. First, each DMA is dedicated to its associated processor, so it is not shared. Second, since the DMAs are coupled to the CPU or DSP, there is much less overhead and the programming time can be 2-3 cycles. Thus, the CPU itself can program the DMA, without need for intervention by the operating system. When using a pair of DMAs for each processor, it is possible to read and write in parallel, thereby utilizing resources even more efficiently. In fact, this arrangement permits a pipeline operation, as the words can be pre-fetched and wait in the DMA so that they are immediately accessible to the CPU. This means that this arrangement both increases processor efficiency and reduces latency, particularly for short transactions. Any repeating pattern can be programmed in an overhead of 1 cycle, so short transactions can be implemented very efficiently.

Although the system has been described herein utilizing a CPU and FIFO, alternatively, the DMA can be utilized with hardware having a local memory.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. An apparatus for direct data transfer in a wireless broadband system having an operating system, the apparatus comprising:
    a central processing unit (CPU);
    a first command First In First Out (FIFO) coupled to the CPU and configured to receive read commands from the CPU;
    a local read FIFO coupled to the first command FIFO for holding received data until the CPU requests the received data;
    a first direct memory access (DMA) unit coupled to the local read FIFO and the first command FIFO, wherein the first DMA unit is dedicated for reading data and wherein the first command FIFO is configured to transfer the read commands in sequence to the first DMA unit, in the absence of intervention by the operating system;
    a second command FIFO coupled to the CPU and configured to receive write commands from the CPU;
    a local write FIFO coupled to the second command FIFO for holding data sent by the CPU for writing to a remote unit; and
    a second DMA unit coupled to the local write FIFO and the second command FIFO, wherein the second DMA unit is dedicated for writing data sent by the CPU and wherein the second command FIFO is configured to transfer write commands in sequence to the second DMA unit, in the absence of intervention by the operating system.

2. The apparatus according to claim 1, further comprising:
    an offset table including a plurality of offsets; and
    an address generation unit in the first DMA unit configured to generate or calculate addresses from a base and at least one offset from the offset table for accessing the local read FIFO.

3. The apparatus according to claim 1, further comprising:
    a hardware unit coupled to the first DMA unit, wherein the hardware unit is configured to receive a signal for initiating a transaction between the hardware unit and the first DMA unit.

4. The apparatus according to claim 1, further comprising a read bus master and a write bus master coupling the first DMA unit to at least one remote unit.

5. The apparatus according to claim 1, further comprising a read bus master and a write bus master coupling the second DMA unit to at least one remote unit.

6. The apparatus according to claim 2, further comprising a read bus master and a write bus master coupling the first DMA unit to at least one remote unit.

7. The apparatus according to claim 3, further comprising a read bus master and a write bus master coupling the second DMA unit to at least one remote unit.

8. The apparatus of claim 1, wherein the local read FIFO is configured to hold received data until the CPU requests the received data, and wherein the local write FIFO is configured to hold data sent by the CPU for writing to a remote unit.

9. A method for direct data transfer in a wireless broadband system, the method comprising:
    receiving at least one read command from a central processing unit (CPU) at a first command First In First Out (FIFO) coupled to the CPU;
    storing received data at a local read FIFO coupled to the first command FIFO until the CPU requests the received data;
    reading, by a first direct memory access (DMA) unit coupled to the local read FIFO and the first command FIFO, received data according to the at least one read command, wherein the first command FIFO is configured to transfer the read commands in sequence to the first DMA unit, in the absence of intervention by the operating system;
    receiving at least one write command from the CPU at a second command FIFO coupled to the CPU;
    storing written data at a local write FIFO coupled to the second command FIFO until the CPU requests the written data; and
    writing, by a second DMA unit coupled to the local write FIFO and the second command FIFO, written data according to the at least one write command, wherein the second command FIFO is configured to transfer the write commands in sequence to the second DMA unit, in the absence of intervention by the operating system.

10. The method according to claim 9, further comprising: providing a base address to the first DMA unit; and calculating, in the first DMA unit, a plurality of addresses in a data memory from the base and a plurality of offsets in an offset table.

11. The method of claim 9, further comprising:
storing received data at a local read FIFO coupled to the first command FIFO until the CPU requests the received data; and
storing written data at a local write FIFO coupled to the second command FIFO until the CPU requests the written data.

12. An apparatus for direct data transfer in a wireless broadband system, comprising:
means for receiving at least one read command from a central processing unit (CPU) at a first command First In First Out (FIFO) coupled to the CPU;
means for storing received data at a local read FIFO coupled to the first command FIFO until the CPU requests the received data;
means for reading, by a first direct memory access (DMA) unit coupled to the local read FIFO and the first command FIFO, received data according to the at least one read command, wherein the first command FIFO is configured to transfer the read commands in sequence to the first DMA unit, in the absence of intervention by the operating system;
means for receiving at least one write command from the CPU at a second command FIFO coupled to the CPU;
means for storing written data at a local write FIFO coupled to the second command FIFO until the CPU requests the written data; and
means for writing, by a second DMA unit coupled to the local write FIFO and the second command FIFO, written data according to the at least one write command, wherein the second command FIFO is configured to transfer the write commands in sequence to the second DMA unit, in the absence of intervention by the operating system.

13. The apparatus according to claim 12, further comprising:
means for providing a base address to the first DMA unit; and
means for calculating, in the first DMA unit, a plurality of addresses in a data memory from the base and a plurality of offsets in an offset table.

14. The apparatus according to claim 12, further comprising:
means for storing received data at a local read FIFO coupled to the first command FIFO until the CPU requests the received data; and
means for receiving at least one write command from the CPU at a second command FIFO coupled to the CPU.

* * * * *